(12) United States Patent
Chen

(10) Patent No.: US 9,069,924 B2
(45) Date of Patent: Jun. 30, 2015

(54) ESD PROTECTION CIRCUIT CELL

(75) Inventor: Bo-Ting Chen, Fengyuan (TW)

(73) Assignee: Taiwan Semiconductor Manufacturing Co., Ltd., Hsin-Chu (TW)

( * ) Notice: Subject to any disclaimer, the term of this patent is extended or adjusted under 35 U.S.C. 154(b) by 699 days.

(21) Appl. No.: 13/339,410

(22) Filed: Dec. 29, 2011

(65) Prior Publication Data

US 2013/0170080 A1    Jul. 4, 2013

(51) Int. Cl.
*H02H 9/00* (2006.01)
*G06F 17/50* (2006.01)
*H01L 27/02* (2006.01)

(52) U.S. Cl.
CPC ........ *G06F 17/5068* (2013.01); *H01L 27/0248* (2013.01); *H01L 27/0296* (2013.01); *G06F 2217/12* (2013.01)

(58) Field of Classification Search
USPC .......................................................... 361/56
See application file for complete search history.

(56) References Cited

U.S. PATENT DOCUMENTS

| | | | | |
|---|---|---|---|---|
| 5,679,971 | A * | 10/1997 | Tamba et al. | 257/357 |
| 6,351,362 | B1 * | 2/2002 | Inoue et al. | 361/111 |
| 7,253,453 | B2 * | 8/2007 | Ker et al. | 257/173 |
| 7,411,767 | B2 | 8/2008 | Huang et al. | |
| 7,417,837 | B2 | 8/2008 | Chen | |
| 7,593,202 | B2 * | 9/2009 | Khazhinsky et al. | 361/56 |
| 2002/0030954 | A1 * | 3/2002 | Duvvury et al. | 361/56 |
| 2002/0084490 | A1 * | 7/2002 | Ker et al. | 257/355 |
| 2003/0023937 | A1 * | 1/2003 | McManus et al. | 716/1 |
| 2008/0218920 | A1 * | 9/2008 | Vanysacker et al. | 361/56 |
| 2009/0097174 | A1 | 4/2009 | Ker et al. | |
| 2010/0019274 | A1 * | 1/2010 | Uno et al. | 257/106 |
| 2010/0147657 | A1 * | 6/2010 | Sen et al. | 200/181 |
| 2011/0063763 | A1 * | 3/2011 | Alvarez et al. | 361/56 |
| 2011/0157251 | A1 * | 6/2011 | Lim et al. | 345/690 |
| 2012/0182652 | A1 * | 7/2012 | Jung | 361/56 |
| 2012/0211749 | A1 * | 8/2012 | Fukuoka et al. | 257/53 |
| 2013/0063843 | A1 * | 3/2013 | Chen et al. | 361/56 |
| 2013/0170080 | A1 * | 7/2013 | Chen | 361/56 |
| 2013/0342940 | A1 * | 12/2013 | Taghizadeh Kaschani | 361/56 |
| 2014/0092507 | A1 * | 4/2014 | Lefferts et al. | 361/56 |
| 2014/0167106 | A1 * | 6/2014 | Salcedo | 257/146 |

OTHER PUBLICATIONS

Ker, M.D. et al., "Layout Design on Multi-Finger Mosfet for On-Chip ESD Protection Circuits in a 0.18-μM Salicided CMOS Process", The 8th IEEE International Conference on Electronics, Circuits and Systems, 2001, 1:361-364.

(Continued)

*Primary Examiner* — Ronald W Leja
(74) *Attorney, Agent, or Firm* — Duane Morris LLP; Steven E. Koffs

(57) ABSTRACT

A protection cell for a cell library. The protection cell defines a protection circuit for an IC having a driving device with a first supply voltage Vdd1 and an output, and a driven device having an input and a second supply voltage Vdd2. The protection circuit includes a first device from the group consisting of a P-diode and a gate-Vdd PMOS. The first device is coupled between a first power bus connected to Vdd2 and the input of the driven device. The input of the driven device is coupled by way of a resistor to the output of the driving device. A second device corresponding to the first device is provided, from the group consisting of an N-diode and a grounded gate NMOS. The second device is coupled between the input of the driven device and a ground bus.

20 Claims, 14 Drawing Sheets

(56) References Cited

OTHER PUBLICATIONS

Ker, M.D. et al., "ESD Protection Circuits With Novel MOS-Bounded Diode Structures", IEEE International Symposium on Circuits and Systems, 2002, 5:V533-V535.

"Electrostatic Discharge (ESD) Technology Roadmap"—ESD Association, Revised Apr. 21, 2010, 6 pages, found at www.esda.org.

Chen, S.H. et al., "Failure analysis and solutions to overcome latchup failure event of a power controller IC in bulk CMOS technology", Microelectronics Reliabiltiy, 2006, 46:1042-1049.

Linten, D., et al., "A 4.5 kV HBM, 300 V CDM, 1.2 kV HMM ESD Protected DC-to-16.1 GHz Wideband LNA in 90 nm CMOS", 31st EOS/EDS Symposium, 2009, pp. 1-6.

* cited by examiner

ESD PROTECTION CIRCUIT CELL

FIELD

The disclosed circuit and method relate to integrated circuits. More particularly, the disclosed system and method relate to electrostatic discharge ("ESD") protection for integrated circuits.

BACKGROUND

With the continued miniaturization of integrated circuit ("IC") devices, the current trend is to produce integrated circuits having shallower junction depths, thinner gate oxides, lightly-doped drain ("LDD") structures, shallow trench isolation ("STI") structures, and self-aligned silicide ("salicide") processes, all of which are used in advanced sub-quarter-micron complementary metal oxide semiconductor ("CMOS") technologies. All of these processes cause the related CMOS IC products to become more susceptible to damage due to ESD events. Therefore, ESD protection circuits are built onto the chip to protect the devices and circuits on the IC from ESD damage.

As semiconductor processing technology advances, the gate dielectric of MOS transistors becomes thinner and increasingly susceptible to damage caused by ESD current. This issue becomes more serious when the MOS transistor is used in a multi-power domain circuitry, where a diode module is typically connected to an I/O ground bus between two power domains. When the ESD occurs, the diode module may induce the ESD current to flow through a damaging path other than the I/O ground bus as a desired path, thereby damaging the thin-gate-dielectric MOS transistors.

According to the ESD Association's Charge Device Model (CDM) roadmap, with the advent of larger capacitance IC packages, the higher capacitance will lead to relatively higher magnitude discharge peak current levels, creating new challenges.

DETAILED DESCRIPTION

Figure 1:
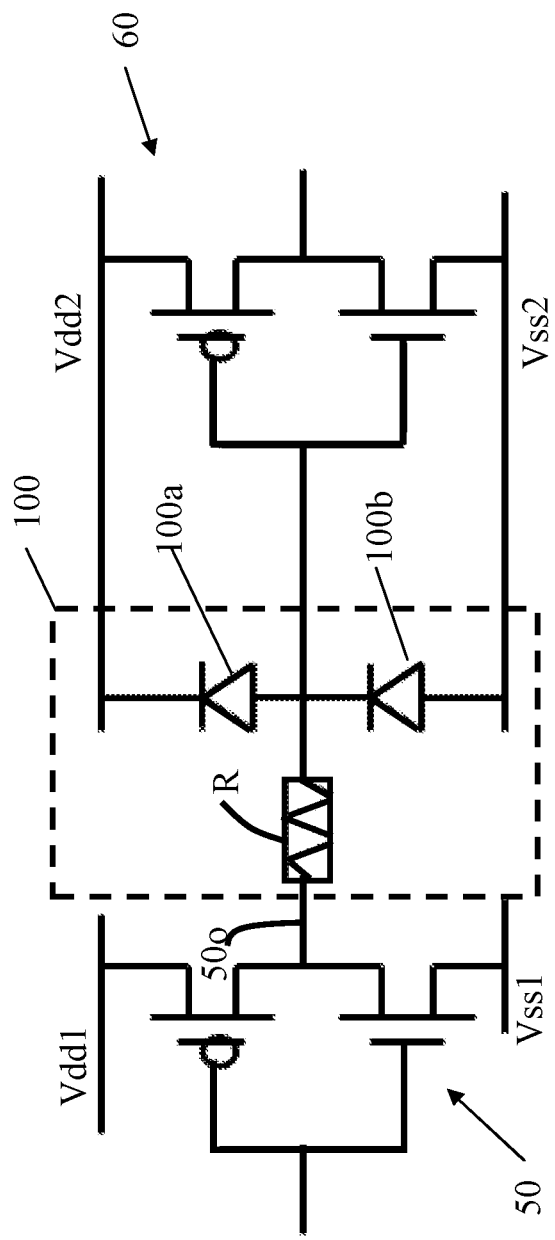
FIG. 1 is a schematic diagram of an ESD protection circuit according to one embodiment.

This description of the exemplary embodiments is intended to be read in connection with the accompanying drawings, which are to be considered part of the entire written description. In the description, relative terms such as "lower," "upper," "horizontal," "vertical,", "above," "below," "up," "down," "top" and "bottom" as well as derivative thereof (e.g., "horizontally," "downwardly," "upwardly," etc.) should be construed to refer to the orientation as then described or as shown in the drawing under discussion. These relative terms are for convenience of description and do not require that the apparatus be constructed or operated in a particular orientation. Terms concerning attachments, coupling and the like, such as "connected" and "interconnected," refer to a relationship wherein structures are secured or attached to one another either directly or indirectly through intervening structures, as well as both movable or rigid attachments or relationships, unless expressly described otherwise.

In various embodiments, an ESD protection circuit of a cross-power-domain interface is provided as a standard cell of a cell library. The protection cell may have the same height as the receiver (driven) domain circuit cells. The ESD protection cell may be readily incorporated into IC designs. The layout of the ESD protection cell saves area on the IC, and provides great flexibility. For increased protection, plural ESD protection cells may be connected in series and laid out in a horizontal chain, or arranged vertically in two or more rows.

FIG. 1 is a schematic diagram of a first embodiment of a protection circuit for a cross-domain interface, where the driving device 50 and driven (receiving) device 60 are in separate power domains. The integrated circuit has a driving device 50 with a first supply voltage Vdd1 and an output 50o, and a driven device 60 having an input and a second supply voltage Vdd2 lower than, equal to, or higher than the first supply voltage Vdd1. The driving device 50 has a ground supply voltage Vss1 and the driven device 60 has a second ground supply voltage Vss2, which may be different from Vss1. Thus, the driving device 50 and driven device 60 may have different power and ground busses. During normal non-ESD operations, current from the driven device passes through output 50o to the gates of PMOS and NMOS of the input of the driven device 60, controlling the switching of the PMOS and NMOS.

The protection circuit 100 may be an ESD clamp circuit between the Vdd2 and Vss2 power rail, comprising a resistor and a pair of devices. In the embodiment of FIG. 1, the devices are a pair of clamping diodes 100a, 100b. During normal non-ESD operation, the current from the driving circuit 50 is passed to the gates of the PMOS and NMOS of the driven circuit 60. If an ESD event occurs, the diode 100*b* may be placed in a reverse bias condition, and transmit the ESD current safely to ground, to avoid exposing the gates of the transistors of driven device 60 to the high ESD voltage.

The protection circuit design is to be incorporated into a standard cell library, to be selected by IC designers as a building block for IC designs. FIG. 10-12C show layout views of five example circuits incorporating the protection circuit 100 of FIG. 1. In each of these figures, the configuration includes at least one protection cell and at least a receiving cell. The receiving cell is provided for laying out at least the input of the protected (driven) device. In some embodiments, the receiving cell contains the entire protected device. In other embodiments, the receiving cell includes the input of the receiving device, and is coupled to one or more additional downstream cells (not shown).

Figure 11:
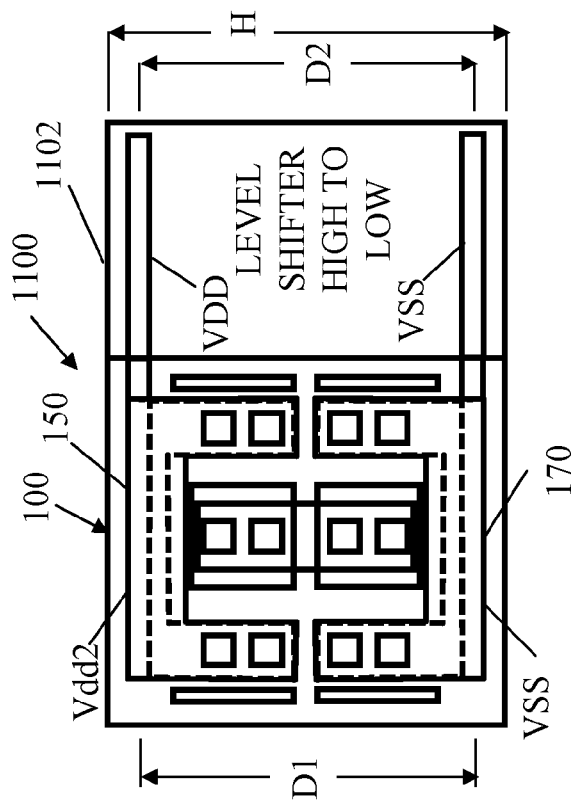
FIG. 11 is an example of a level shifter with the left version of the protection circuit directly abutted thereto.
Figure 12A:
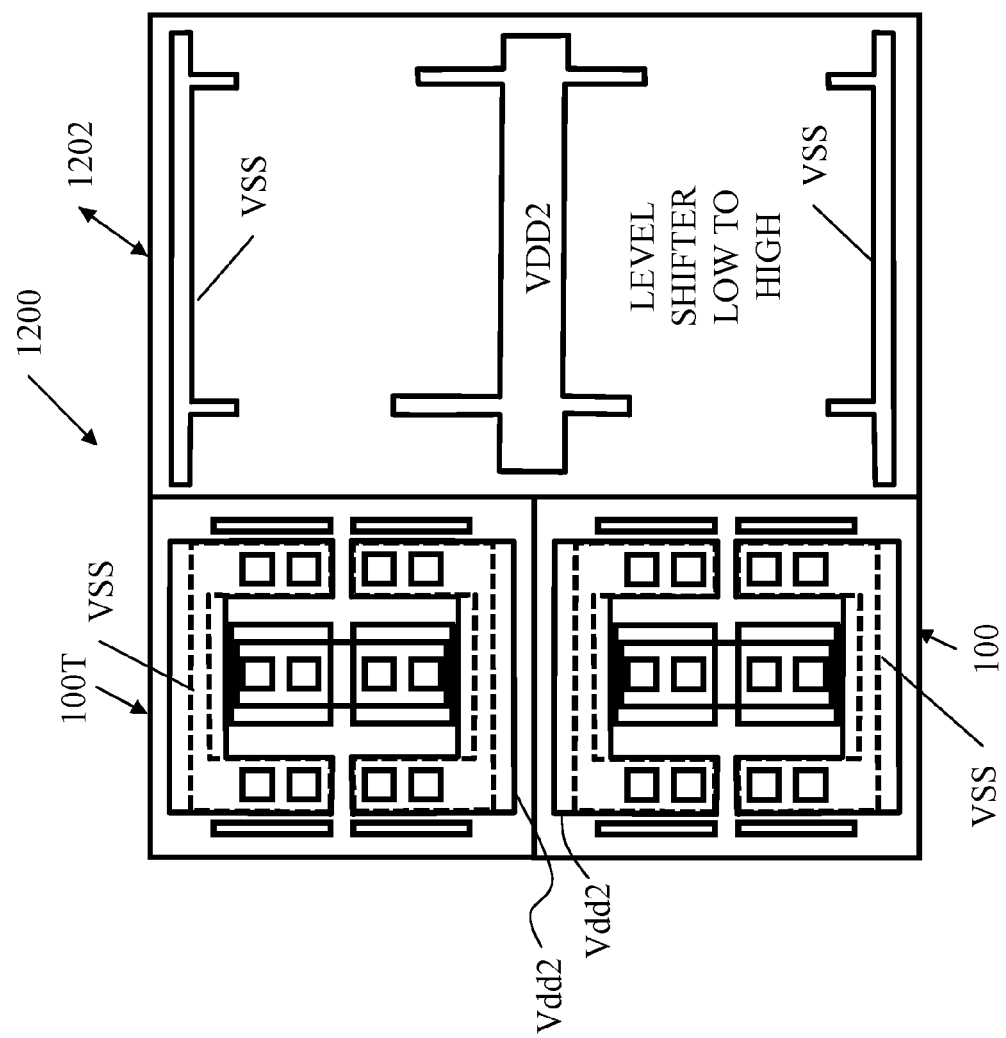
FIG. 12A is an example of two protection circuits laid out vertically adjacent to each other

In FIGS. 10, 11, 12B and 12C, the protection cell 100 has a cell height H that is the same as a cell height of the receiving cell. In FIGS. 10, 11, 12B and 12C, the protection cell is horizontally abutted to the receiving cell. In FIG. 12A, the receiving cell has a height 2 H, and two of the protection cells are vertically abutted, so that the total height of the vertically abutted protection cells also equals 2H.

Figure 10:
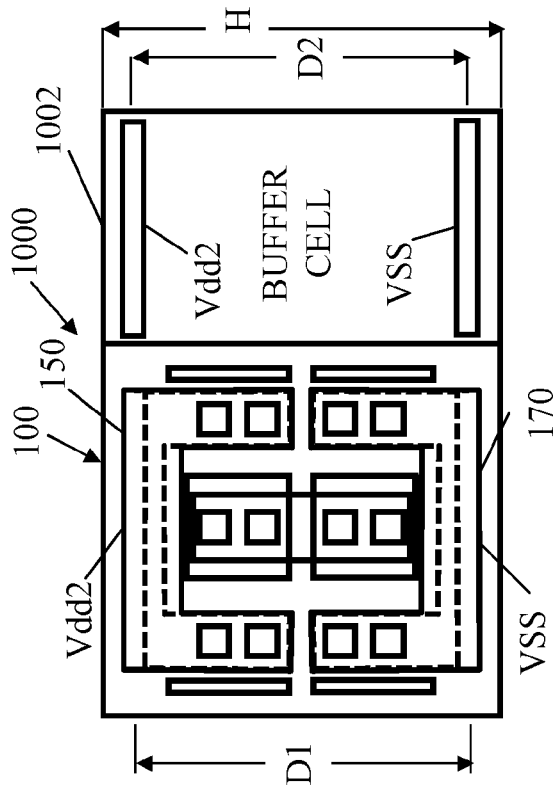
FIG. 10 shows an example of a buffer cell protected by the device of FIG. 3.

FIG. 10 shows a circuit 1000 including the protection cell 100 configured to protect a buffer cell 1002. FIG. 11 shows a circuit 1100 including the protection cell 100 configured to protect a high-to-low level shifter 1102. FIG. 11 also shows that the power bus Vdd2 of the protection circuit 100 is abutted to the power bus VDD of the receiving circuit 1102, and the ground bus VSS of the protection circuit 100 is abutted to the ground bus of the receiving circuit.

The protection circuit 100 has a first power bus 150 connected to Vdd2. The circuit 100 has a first ground bus 170 connected to a ground supply voltage VSS.

As best seen in FIGS. 10 and 11, the ground supply bus 170 is arranged so that a distance D1 between the first power bus 150 and the first ground bus 170 matches a distance D2 between a power bus of the driven device and a ground bus of the driven device. Also shown in FIGS. 10 and 11, the height H of the protection cell 100 matches the height H of the standard library cells for the power domain of the receiver (driven) circuit 1002, 1102.

Thus, the protection cell 100 can be included in IC designs and automatically placed by a place and route tool of an electronic design automation (EDA) system.

Figure 3:
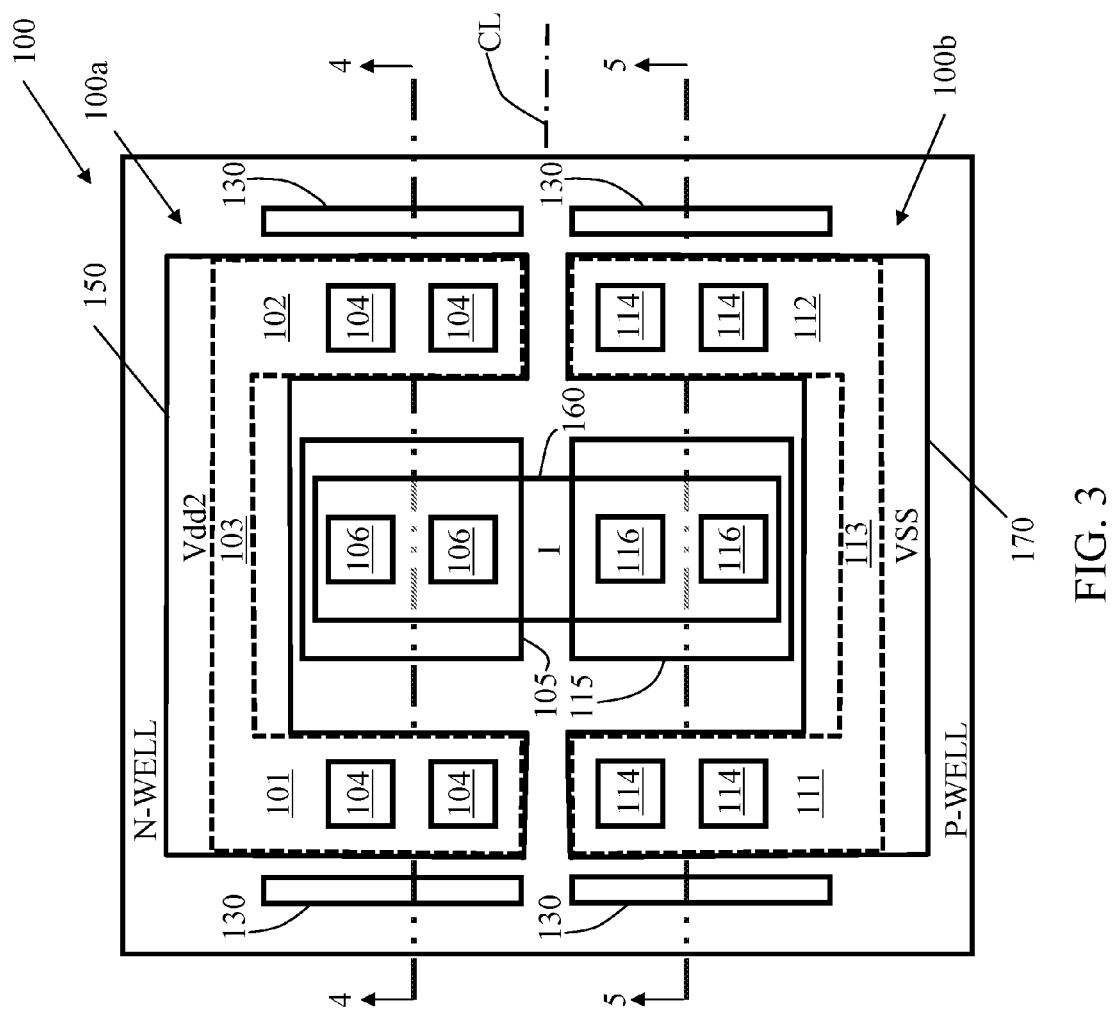
FIG. 3 is a plan view of a layout of the ESD protection circuit of FIG. 1.
Figure 4:
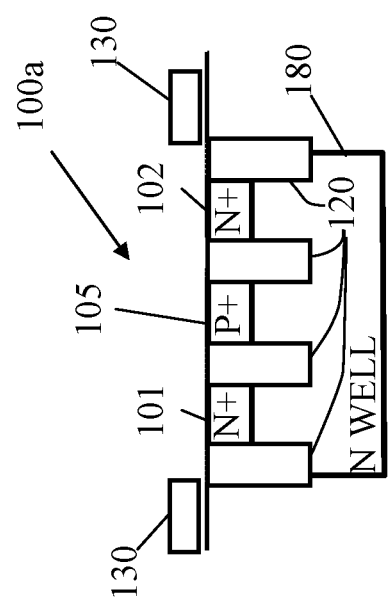
FIG. 4 is a cross sectional view of the circuit of FIG. 3, taken along section line 4-4 of FIG. 3.
Figure 5:
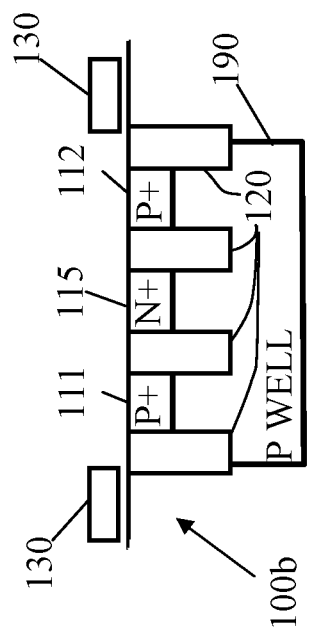
FIG. 5 is a cross sectional view of the circuit of FIG. 3, taken along section line 5-5 of FIG. 3.
Figure 7:
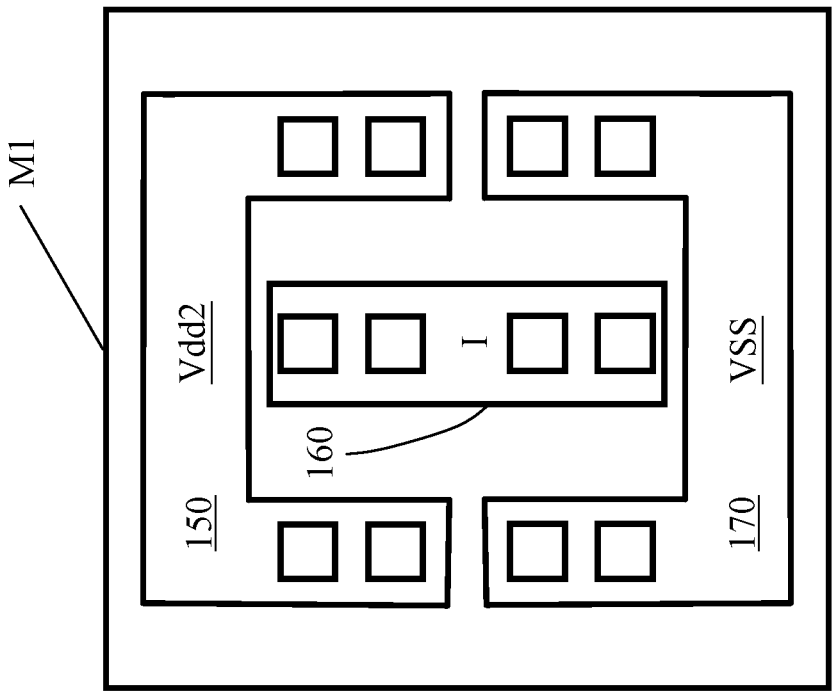
FIG. 7 is a plan view of the metal 1 (M1) layer of the layout of FIG. 3.
Figure 6:
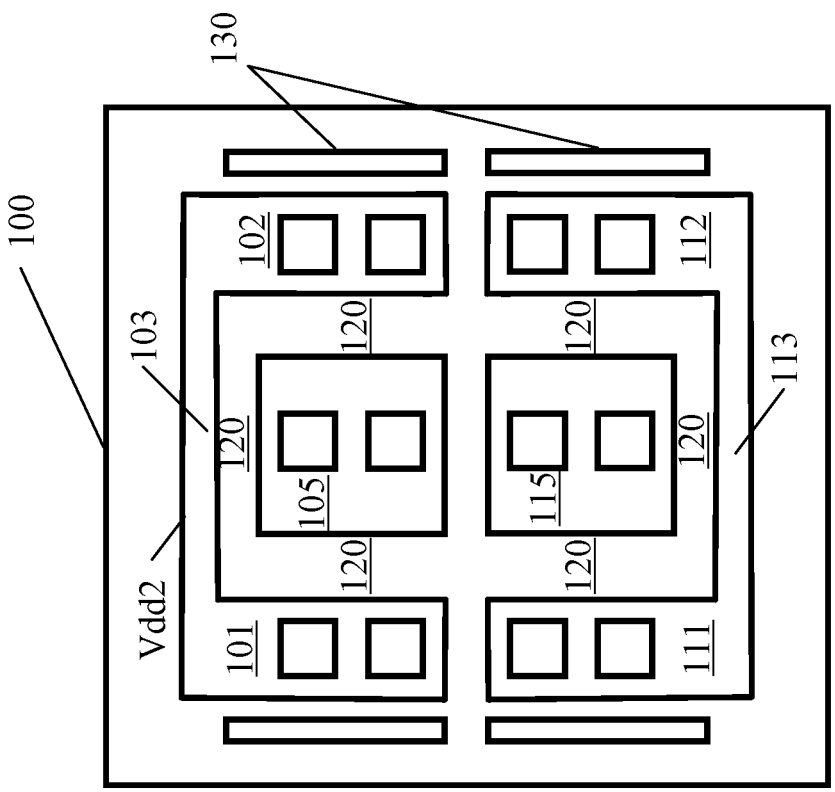
FIG. 6 is a plan view of the gate electrode layer of the layout of FIG. 3.

Referring now to FIGS. 3-7, details of the protection cell 100 are shown. For ease of understanding, the gate dielectric layer and substrate active regions are shown in FIG. 6, and the metal layer (e.g., first metal layer, M1) patterns are shown in FIG. 7. Also, a cross sectional view of the P-diode 100*a* is shown in FIG. 4, and a cross sectional view of the N-diode 100*b* is shown in FIG. 5. Although in example the interconnections for the protection device are provided in the M1 layer, these interconnections may be formed in any of the interconnect line layers.

The substrate has a first device, which in this embodiment is a P-diode 100*a*. The P-diode is coupled between the first power bus 150 (Vdd2) and the input I of the driven device 60. The input I of the driven device 60 is coupled by way of a resistor R (FIG. 1) to the output 50*o* of the driving device 50. The substrate has an N well 180 (FIG. 4) containing the N+ type diffusion regions 101-103 and P+ diffusion region 105. The N+ diffusions and P+ diffusion are separated by shallow trench isolation STI regions 120 (FIG. 4). The STI regions are only shown in FIGS. 4, 5, and 6 to simplify FIG. 3. The N+ diffusion regions 101-103 are connected in a U configuration, surrounding the P+ diffusion region 105 on three sides. The N+ diffusion regions 101 and 102 are also connected by contact vias 104 to a power bus pattern 150 in the M1 layer. The N+ regions 101 and 102 are connected to by way of contact vias 104 to a Vdd2 bus pattern 150 in the M1 layer.

The substrate has a second device 100*b* corresponding to the first device 100*a*. That is, if the first device 100*a* is a P diode, the second device 100*b* is an N diode (Alternatively, if the first device is a GDPMOS, the second device is a GGN-MOS). In FIG. 3, the second device is an N diode 100*b*. The second device 100*b* is coupled between the input I of the driven device 60 and the ground bus 170 (VSS).

N diode 100*b* has a P well 190 (FIG. 4) containing the P+ type diffusion regions 111-113 and N+ diffusion region 115, separated by shallow trench isolation (STI) regions 120 (FIG. 4). The P+ diffusion regions 111-113 are connected in a U configuration, surrounding the N+ diffusion region 115 on three sides. The P+ diffusion regions 111 and 112 are also connected by contact vias 114 to a ground bus pattern 170 in the M1 layer.

The anode (P+ region) 105 of the P diode is connected to the cathode (N+ region) 115 of the N diode by way of contact vias 106, contact vias 116 and a connecting line pattern 160 in the M1 layer. The pattern 160 is in turn connected to the input of the driven device by way of another interconnect pattern (not shown) in the same metal layer or another metal layer. Thus, the P diode anode 105 and N diode cathode 115 are both connected to the input of the receiving (driven) device 60.

Optionally, the protection circuit 100 further comprises at least one dummy pattern 130 adjacent the first or second N+ region 101, 102 of the first device 100*a* and/or the first or second P+ region 111, 112 of the second device 100*b*. The dummy patterns are not connected to any other devices. For example, dummy conductors may be formed in the gate electrode layer to maintain a desired polysilicon density. Polysilicon density is controlled in advanced technologies to prevent dishing and erosion in subsequently formed layers. The dummy pattern 130 is arranged in a direction extending from the power bus to the ground bus. In the example, a respective dummy pattern 130 is arranged vertically on each side of each of the P diode 100*a* and N diode 100*b*. This is just one example. Other dummy configurations (or no dummy patterns) may be used as desired to maintain any target polysilicon density.

In the example of FIG. 3, the P diode 100*a* and N diode 100*b* are arranged symmetrically about an equatorial center-line CL of the protection cell shown in FIG. 3 (although the dopant types in each region of the P diode differs from the corresponding region of the N diode). Protection cell 100 is also left-to-right symmetric about a vertical axis.

Figure 9:
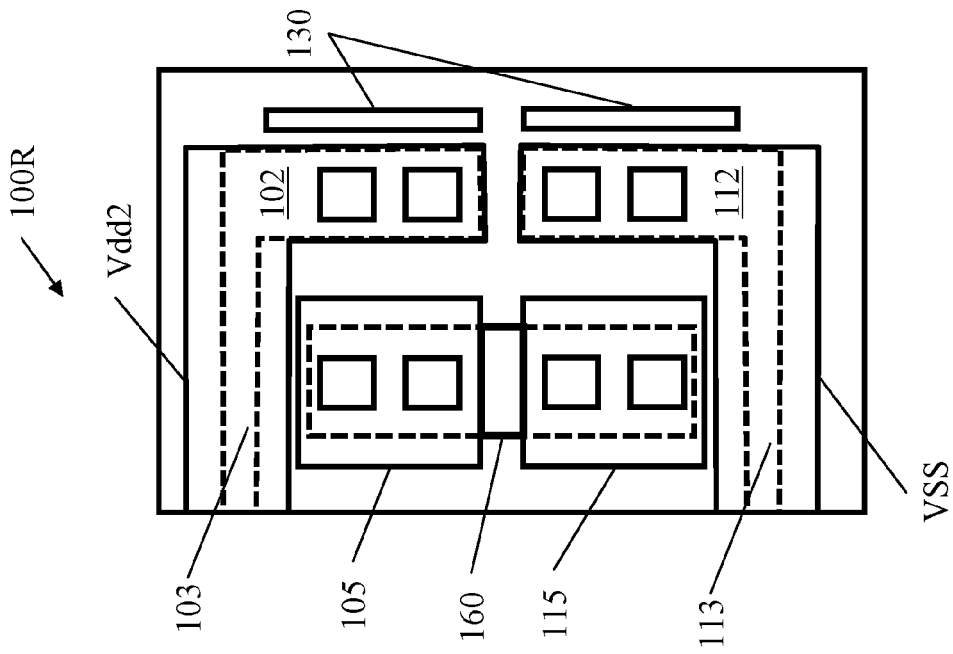
FIG. 9 is a plan view of right version of the layout of FIG. 3.
Figure 8:
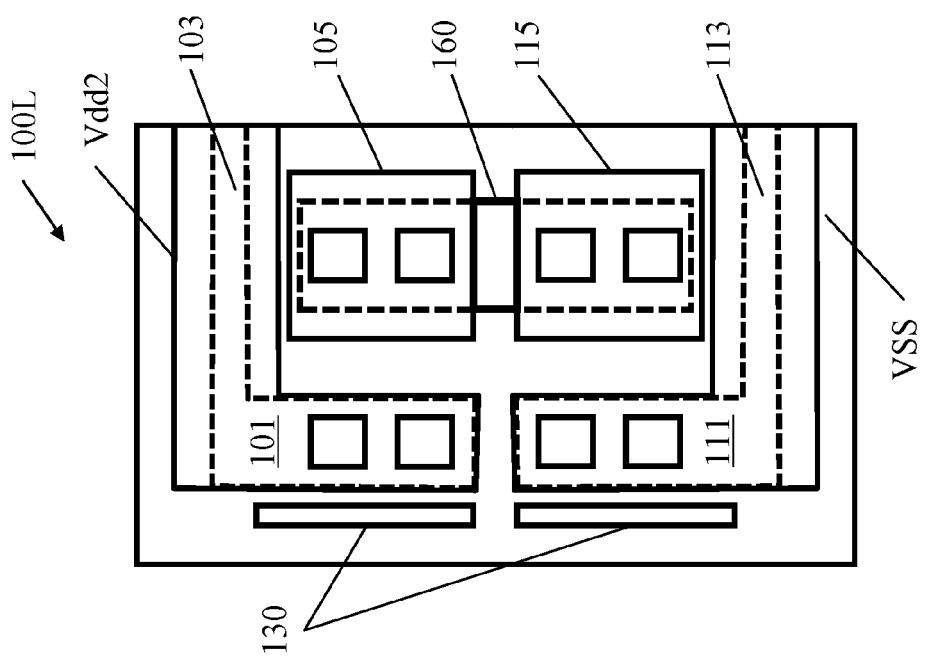
FIG. 8 is a plan view of left version of the layout of FIG. 3.

FIGS. 8 and 9 show two variations of the protection cell 100L, 100R, in which the U configurations of the active regions 101-103, 111-113 are shortened to an L configuration 101, 103 and 111, 113. Also, dummy patterns 130 are only provided on one side of the protection cells 100L, 100R. FIG. 8 is a left handed version of the protection cell 100L, and FIG. 9 is a right handed version of the protection cell. These configurations are designed to be directly abutted to one another in configurations including two or more protection cells 100, 100L and/or 100R (as shown in FIG. 12B), to increase the amount of ESD protection.

Figure 12B:
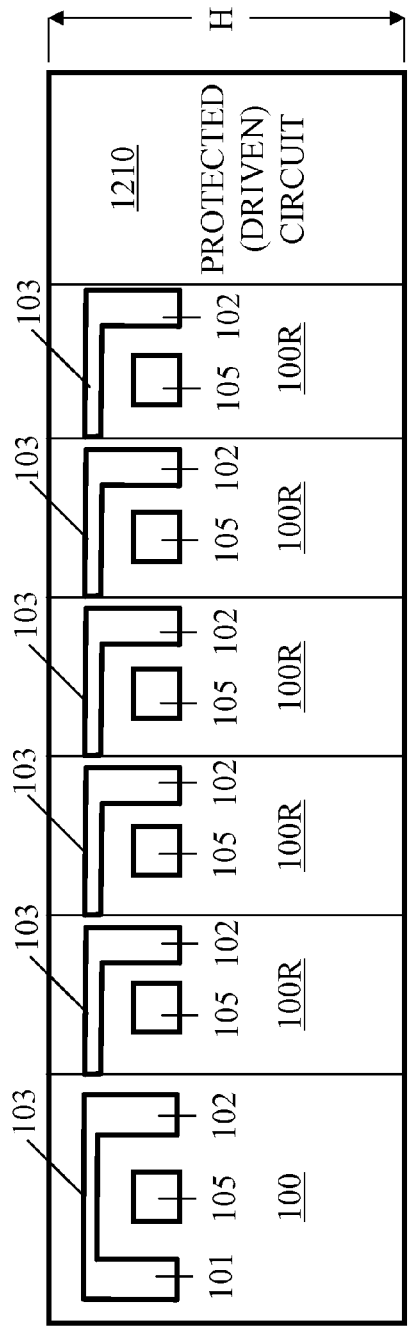
FIGS. 12B and 12C are examples of a plurality of protection circuits arranged horizontally.

In FIG. 12B, only patterns 101-103 and 105 of the P diode are partially shown, for ease of understanding. In the protection circuit 100, each diode has three-sided, U configuration active region 101-103, 111-113, for forming the cathode. In the right protection cell 100R, the portion 101 is omitted. Instead, in the first (leftmost) cell 100R adjacent cell 100, the anode (P+ region 105) of the protection circuit 100R is surrounded by N+ regions 102 and 103 of cell 100R and region 102 of the adjacent cell 100. For the second and subsequent cell 100R, the cathode is formed by N+ regions 102 and 103 of cell that cell 100R and the N+ region 102 of the preceding adjacent cell 100R. Although not shown in FIG. 12B, the arrangement of the active regions 111-113 of the cells 100, 100R are mirror images of the regions 101-113, as readily understood by one of ordinary skill in the art.

Figure 12C:
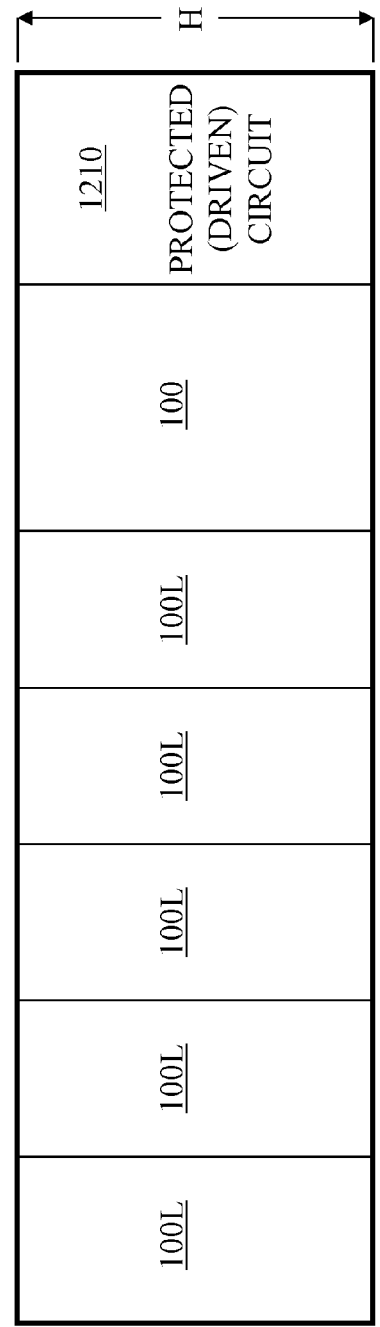

The protection cells 100, 100L, 100R occupy a much smaller footprint than a diode clamp formed of multiple devices not contained within a single library cell. Further, the left protection cell 100L and right protection cell 100R occupy a substantially smaller horizontal width (and area) than protection cell 100. This enables the designer to adjust the number of CDM protection unit cells depending on the internal core circuitry available area. The designer can select the number of CDM protection unit cells to maximize protection, minimize area, or optimize the number to improve both the protection and area relative to other designs. Thus, given an available area on the substrate, several protection devices may be abutted together. The designer can abut one or more additional second protection cells 100L, 100R to the second protection cell 100L, 100R (as shown in FIG. 12B or 12C), so as to include as many of the second protection cells as can fit into a space available for protection circuitry. The designer can choose to provide more protection in the same area, or provide the same amount of ESD protection in a smaller area, freeing up space on the die for additional functional circuitry.

Left protection cell 100L (FIG. 8) omits the right N+ diffusion region 102 of the P diode 100a, the right P+ diffusion region 112 of the N diode 100b, and the dummy patterns 130 on the right side. Right protection cell 100R (FIG. 9) omits the left P+ diffusion region 101 of the P diode 100a, the left P+ diffusion region 111 of the N diode 100b, and the dummy patterns 130 on the left side. Thus, protection cells 100L and 100R occupy approximately 30% less area than protection cell 100.

As shown in FIG. 12B, once a protection cell 100 is selected, the designer can select additional protection cells 100R, each having a smaller width than cell 100. Right protection cell 100R is designed to be directly abutted to the right of a protection cell 100 or another right protection cell 100R. The N+ diffusion region 102 of the first protection cell combined with the N+ diffusion region 103 and 101 of the second protection cell 100R completes the U shaped N+ diffusion pattern partially surrounding the P+ diffusion region 105 of the second protection cell 100R. Since protection cell 100R is the same as the right portion of protection cell 100, third and subsequent protection cells 100R can optionally be abutted in the same manner.

FIG. 12C shows another arrangement for abutting plural protection cells together. In this example, the protection cell 100 of FIG. 3 is on the right side, and several instances of the left protection cell 100L are abutted to each other and to the cell 100.

As shown in FIG. 12C, once a protection cell 100 is selected, the designer can select additional protection cells 100L, each having a smaller width than cell 100. Left protection cell 100L is designed to be directly abutted to the left of a protection cell 100 or another right protection cell 100L. The N+ diffusion region 101 of the first protection cell 100 is combined with the N+ diffusion region 103 and 102 of the second protection cell 100R completes the U shaped N+ diffusion pattern partially surrounding the P+ diffusion region 105 of the second protection cell 100R. Since protection cell 100R is the same as the right portion of protection cell 100, third and subsequent protection cells 100R can optionally be abutted in the same manner.

When a second unit protection cell 100, 100L or 100R is included in the protection circuit, the second unit cell has a second power bus Vdd2 connected to the first power bus Vdd2 of the first unit protection cell. Also, the second unit cell 100, 100L or 100R has a second ground bus Vss connected to the first ground bus. The protection cell 100 is configured so that the first device (P diode 100a) is positioned near a PMOS of the driven device 60. The second device (N diode 100b) is positioned near an NMOS of the driven device 60. The PMOS of the driven device and the NMOS of the driven device are both connected to the input of the driven device. This configuration simplifies routing.

Thus, the layouts of the unit protection cells 100, 100L or 100R ensure that the power and ground buses of the unit protection cells are aligned for direct abutment. The second unit cell is connected similarly to the first unit cell 100, and has a P diode 100a coupled between the second power bus Vdd2 and the input I of the driven device. The second unit cell has an N diode coupled between the input I of the driven device and the ground bus Vss. The anode (P+ region) 105 of the P diode and cathode (N+ region) 115 of the N diode of the second unit protection cell are connected to patterns 160, which are in turn connected to the input I of the receiving (driven) circuit 60 by a conductive pattern (not shown) in the M1 layer or another interconnect layer.

FIG. 12A shows another option for incorporating two or more protection cells 100, 100T into an integrated circuit 1200. A receiving circuit 1202 may be designed to be twice the height of a unit cell, with the power bus Vdd2 in the middle, and ground buses Vss at the top and bottom. In FIG. 12A, the protections circuits 100T, 100 are arranged vertically, one above the other. The top protection circuit 100T may be laid out as a mirror image of the protection circuit 100, with the ground bus VSS on top and the power bus Vdd2 on the bottom. This allows the first and second power buses Vdd2 of the respective first and second protection devices 100, 100T to be adjacent to one another, simplifying the power connections to the receiving (driven) circuit 1202.

Figure 2:
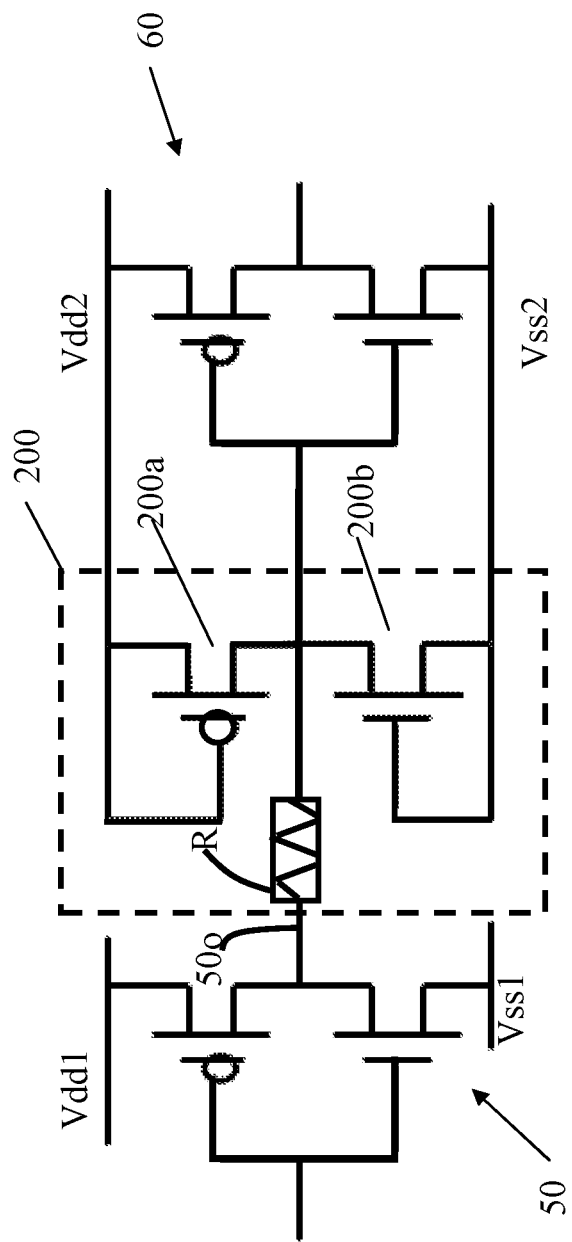
FIG. 2 is a schematic diagram of an ESD protection circuit according to a second embodiment.

FIG. 2 is a schematic of another embodiment of a protection circuit 200, which can be used in a cross-domain interface. This protection circuit 200 differs from circuit 100 in that the clamping diodes 100a and 100b are replaced by a gate-Vdd PMOS (GDPMOS) 200a and a gate grounded NMOS (GGNMOS) 200b. The GDPMOS is a relatively large PMOS device in which the gate, drain and base are tied to power (Vdd2), forming a pnp bipolar junction transistor (BJT), with the source (p-type) acting as collector, base/drain combination (p-type) acting as the emitter, and the substrate (n type) as the base. The GGNMOS is a relatively large NMOS device in which the gate, source and base are tied to ground (Vss), forming an npn BJT, with the drain (n-type) acting as collector, base/source combination (n-type) acting as the emitter, and the substrate (p type) as the base. There is a parasitic resistance between the emitter and base terminals of the GDPMOS and GGNMOS.

FIGS. 13-17 show the protection circuit 200 of FIG. 2. In the example of FIGS. 13-17, the first device 200a is a GDPMOS, and the second device 200b is a GGNMOS.

In the embodiment of FIGS. 13-17, the first device is a gate-Vdd PMOS 200a having first and second N+ regions 201, 202 connected by a third N+ region 203. A plurality of P+ regions 210, 210A are arranged between the first and second N+ regions 201, 202. Each pair of successive P+ regions 210, 210A are separated from each other. The N+ regions 201, 202 and an inner one of the P+ regions 210A are connected to Vdd2, thus tying the gate to Vdd2. The N+ regions 201, 202 are connected by contact vias 204 to the power bus Vdd2 in the M1 layer. The anode (P+ region 210A) is connected by contact via 209 to the power bus Vdd2 in the M1 layer. Outer ones of the P+ regions 210 are connected to the input I of the driven device 60, by way of contact vias 206. A gate electrode 205 is coupled to Vdd2 by way of contact vias 207. The gate electrode 205 has finger portions 205F between (in the X direction) and above (in the Z direction) ones of the plurality of P+ regions 210, 210A.

The second device 200b is a GGNMOS having first and second P+ regions 211, 212 connected by a third P+ region 213, and a plurality of N+ regions 220, 220C between the first and second P+ regions 211, 212. The P+ regions 211, 212 are connected to the ground bus VSS by contact vias 214 and the ground bus pattern 270 in the M1 layer. And the cathode (inner N+ region 220C) are connected to ground by way of contact via 219 and the ground bus pattern 270. Outer N+ regions 220 are connected to the input of the driven device 60 by way of contact vias 216 and the pattern 260 in M1. A gate electrode 215 is coupled to ground by way of contact vias 217 and the ground bus pattern 270 in the M1 layer. The gate electrode 215 has portions between and above ones of the plurality of N+ regions 220, 220C.

The gate coupling technique is used to control the gates of the GDPMOS 200a and GGNMOS 200b to speed up the turn on (breakdown under reverse-biased) speed of these devices under negative-to-Vdd ESD stress for the GDPMOS 200a and positive-to-VSS ESD stress for GGNMOS 200b.

Figure 13:
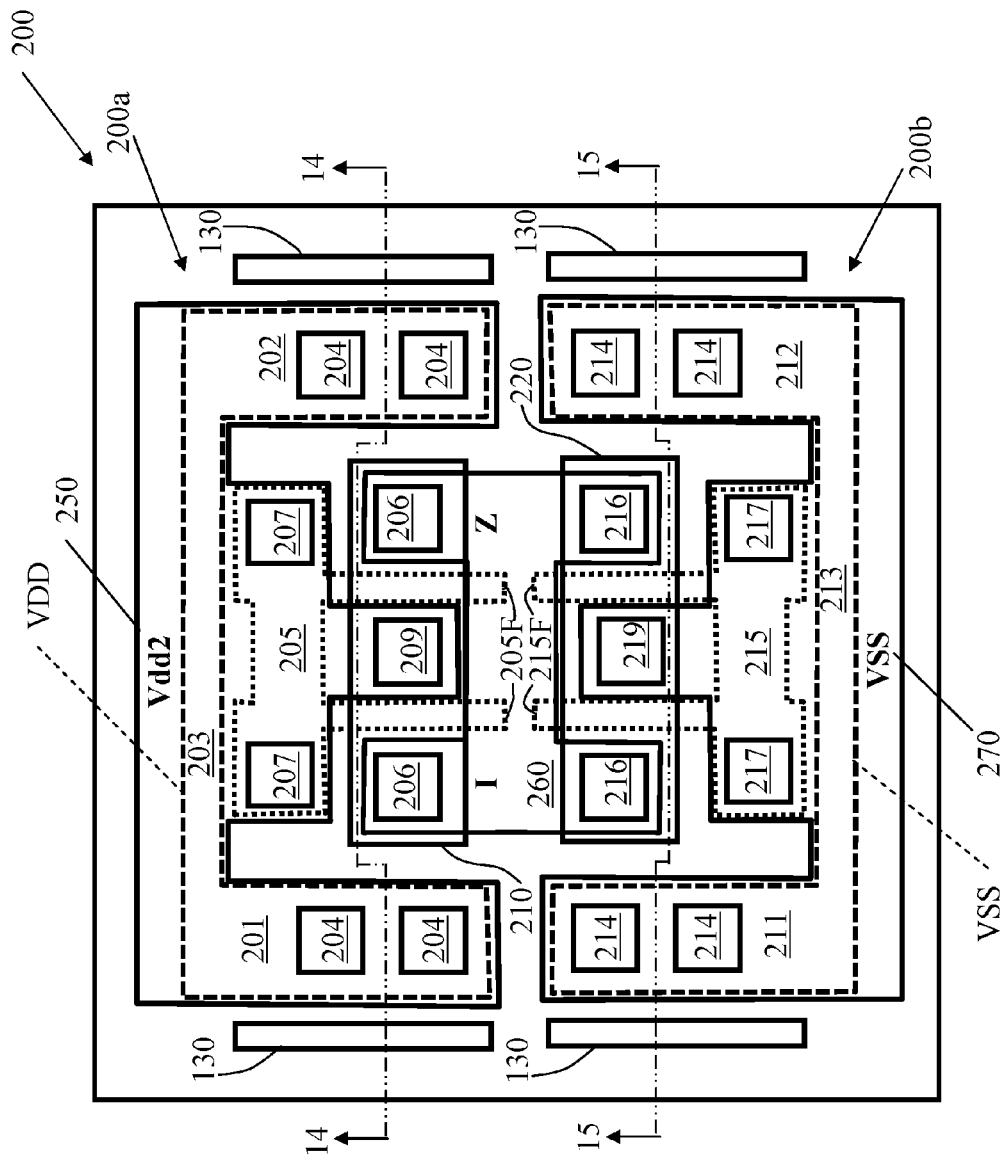
FIG. 13 is a plan view of a layout of the ESD protection circuit of FIG. 2.
Figure 14:
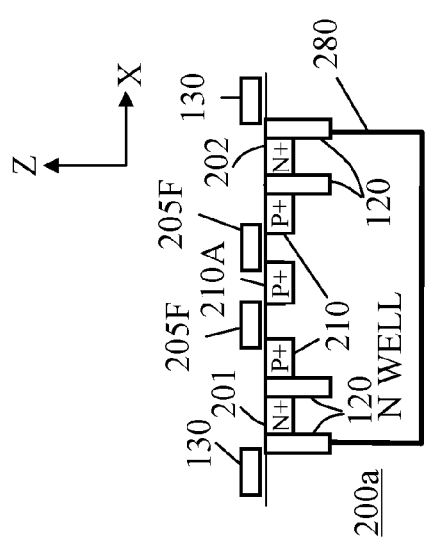
FIG. 14 is a cross sectional view of the circuit of FIG. 13, taken along section line 14-14 of FIG. 13.
Figure 15:
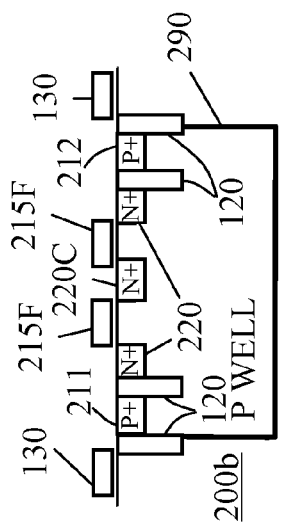
FIG. 15 is a cross sectional view of the circuit of FIG. 13, taken along section line 15-15 of FIG. 13.
Figure 17:
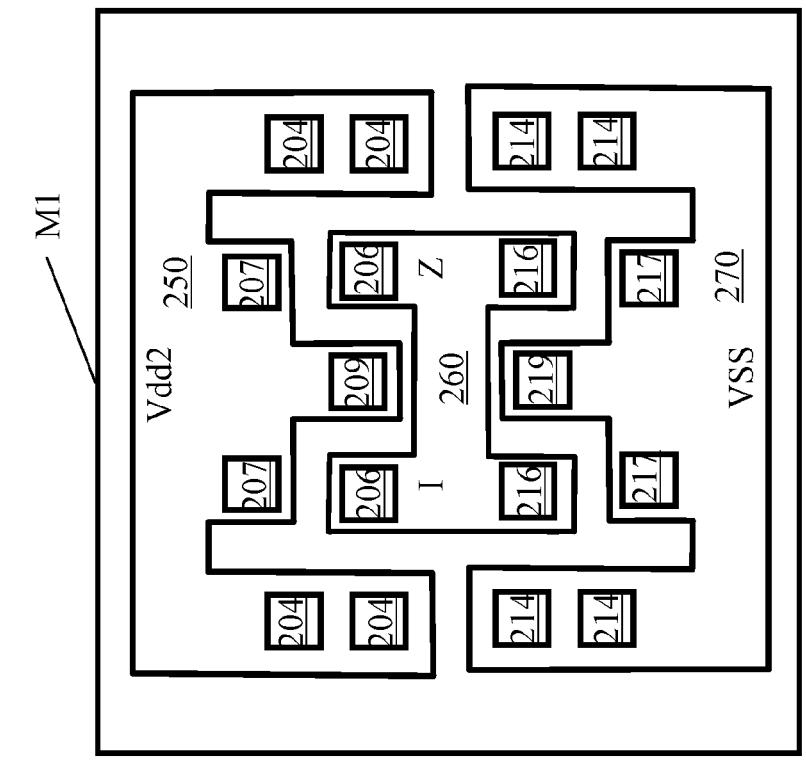
FIG. 17 is a plan view of the metal 1 (M1) layer of the layout of FIG. 13.
Figure 16:
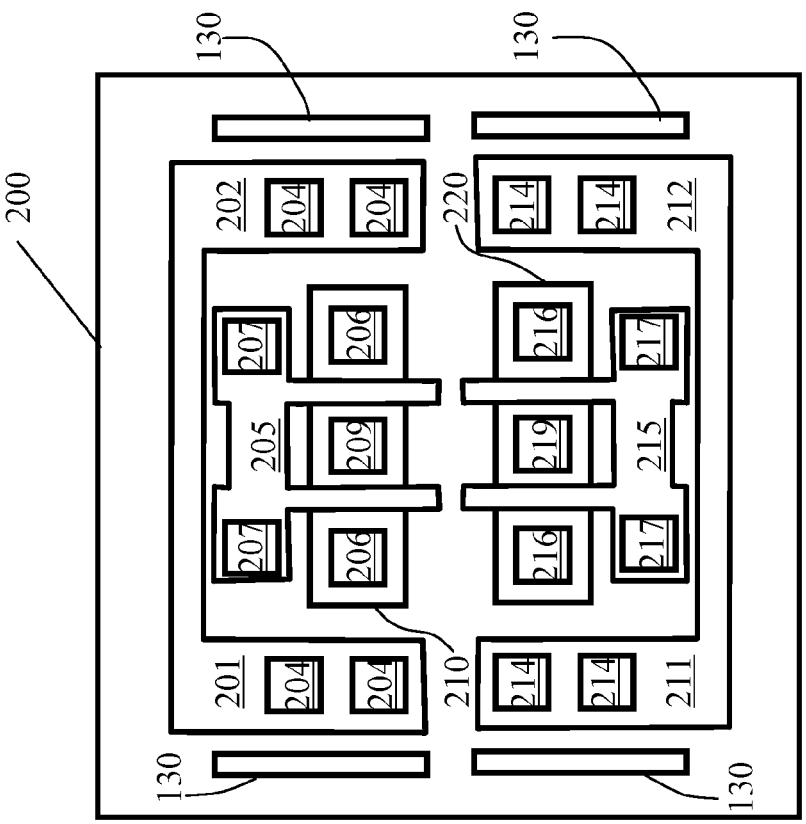
FIG. 16 is a plan view of the gate electrode layer of the layout of FIG. 13.
Figure 19:
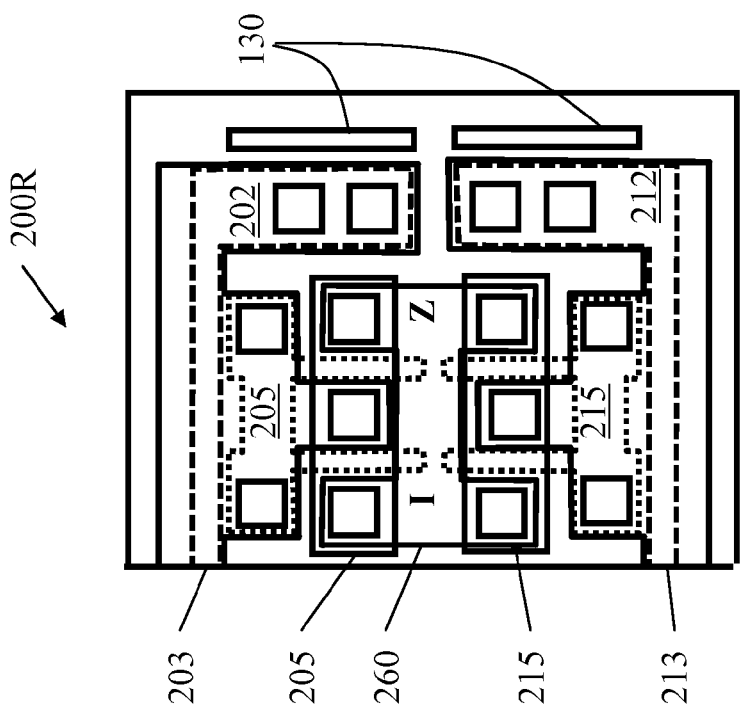
FIG. 19 is a plan view of right version of the layout of FIG. 13.
Figure 18:
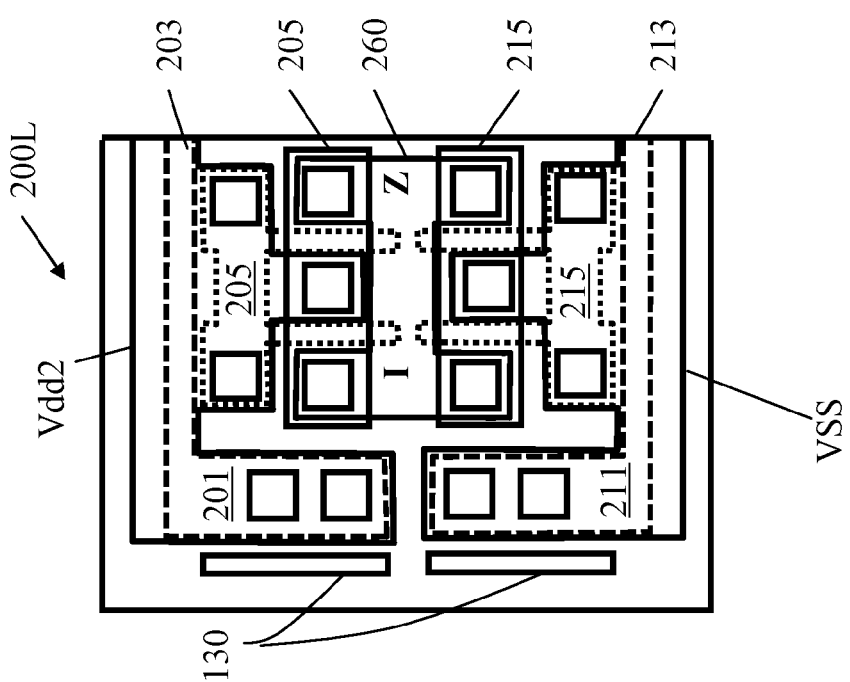
FIG. 18 is a plan view of left version of the layout of FIG. 13.

FIGS. 18 and 19 show two variations of the protection cell 200L. In cell 200L, the U configurations of the active regions 201-203, 211-213 are shortened to an L configuration 201, 203 and 211,213. In cell 200R, the U configurations of the active regions 201-203, 211-213 are shortened to an L configuration 202,203 and 212,213. The U and L configuration regions are arranged in a similar fashion to that shown in FIG. 12B, as discussed above. FIG. 18 shows a left-handed version of the protection circuit 200. Protection circuit 200L may be substituted for protection circuit 100L in configurations having two or more protection unit cells, as shown in FIG. 12C. FIG. 19 shows a right-handed version of the protection circuit 200. Protection circuit 200R may be substituted for protection circuit 100R in configurations having two or more protection unit cells, as shown in FIG. 12B. The width and area of protection circuits 200L (FIGS. 18) and 200R (FIG. 19) are about 30% less than the width and area of the protection circuit 200 (FIG. 13). Thus, the protection circuits unit cells 200, 200L and 200R can be used in any desired number, to provide maximize the ESD protection within an available space, to minimize the space used to achieve a target amount of ESD protection, or in an optimized number that saves space and increases protection.

Figure 20:
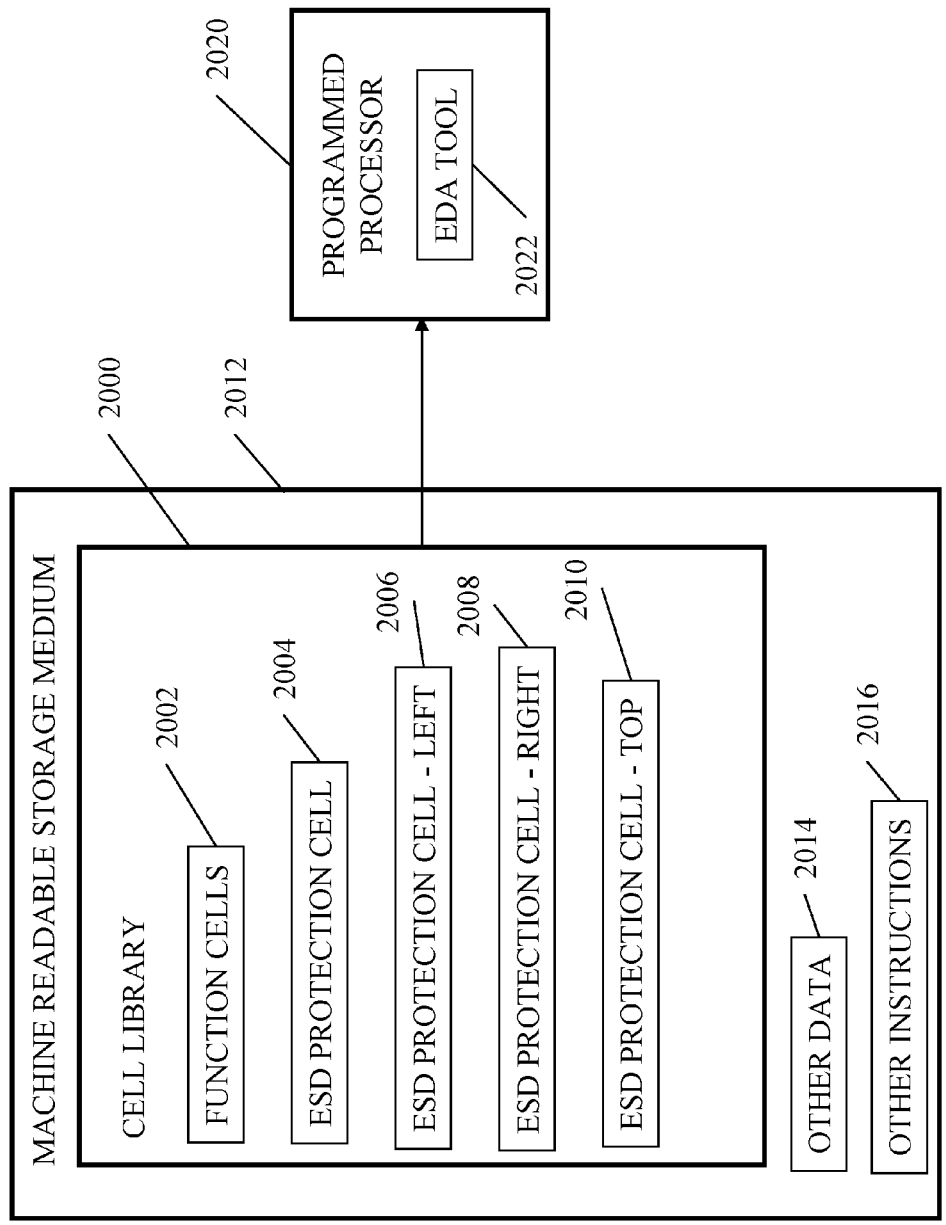
FIG. 20 is a block diagram of a system having a cell library and EDA tool.

FIG. 20 is a block diagram of an exemplary system. The system includes at least one programmed processor 2020 and at least one persistent computer readable storage medium 2012. The processor executes one or more EDA tools 2022. The EDA tools may include, for example, tools for logic synthesis, place and route, design rule checks and layout versus schematic, among others.

The at least one persistent machine readable storage medium stores data 2014 and instructions 2016 used by the processor. The medium stores at least one cell library 2000. The cell library contains a plurality of standard function cells 2002. Each standard cell includes transistor and interconnect structures to provides a respective logic function (e.g., AND, OR, XOR, XNOR, inverters), a storage function (flipflop or latch) or more complex circuit functions. The library also contains at least one ESD protection cell 2004. In some libraries, the ESD protection cell contains the clamping diode pair 100 of FIG. 3. In some libraries, the ESD protection cell contains the GDPMOS/GGNMOS pair 200 of FIG. 13. In some libraries, both versions 100, 200 are available, and the designer can select either protection circuit 100 or circuit 200. Some libraries also provide a left-handed version of the cell 2006 (as shown in FIG. 8 or 18) and/or a right-handed version of the cell 2008 (as shown in FIG. 9 or 19). Some libraries further include a vertically rotated top version of the cell 100T (as shown in FIG. 12A) to allow vertically adjacent cells 100, 100T to connect to the same power bus VDD2 in the receiving circuit 1202. The cell library 2000 may contain any combination of one or more of the above described ESD protection cells 2004, 2006, 2008, 2010.

Although not limited to such applications, the protection circuits shown and described herein provide protection suitable for CDM applications (e.g., a large die with a thin gate insulating layer). The protection circuit provides an area efficient layout which can readily be incorporated into logic designs.

In some embodiments, an integrated circuit has a driving device with a first supply voltage Vdd1 and an output, and a driven device having an input and a second supply voltage Vdd2 lower, equal to, or higher than the first supply voltage Vdd1. A protection circuit comprises: a first power bus connected to Vdd2. A first ground bus is connected to a ground supply voltage. The first ground bus is arranged so that a distance between the first power bus and the first ground bus matches a distance between a power bus of the driven device and a ground bus of the driven device. A first device is provided from the group consisting of a P-diode and a gate-Vdd PMOS. The first device is coupled between the first power bus and the input of the driven device. The input of the driven device is coupled by way of a resistor to the output of the driving device. A second device corresponding to the first device is provide from the group consisting of an N-diode and a grounded gate NMOS. The second device is coupled between the input of the driven device and the ground bus.

In some embodiments, a persistent, computer readable storage medium is encoded with a cell library for an electronic design automation (EDA) tool. The cell library has a plurality of cell designs for implementing respective logic functions. The library comprises at least one protection cell defining a protection circuit for an integrated circuit having a driving device with a first supply voltage Vdd1 and an output, and a driven device having an input and a second supply voltage Vdd2 lower, equal to or higher than the first supply voltage Vdd1. The protection circuit includes: a first device from the group consisting of a P-diode and a gate-Vdd PMOS. The first device is coupled between a first power bus coupled to Vdd2 and the input of the driven device. The input of the driven device is coupled by way of a resistor to the output of the driving device. A second device corresponding to the first device, is provided from the group consisting of an N-diode and a grounded gate NMOS. The second device is coupled between the input of the driven device and a ground bus. A receiving cell is provided for laying out at least the input of the driven device. The protection cell has a cell height that is the same as a cell height of the receiving cell.

In some embodiments, a method of laying out an integrated circuit (IC), comprises: selecting a protection cell from a cell library, the protection cell defining a protection circuit for an IC having a driving device with a first supply voltage Vdd1 and an output, and a driven device having an input and a second supply voltage Vdd2. The protection circuit includes a first device from the group consisting of a P-diode and a gate-Vdd PMOS. The first device is coupled between a first power bus connected to Vdd2 and the input of the driven device. The input of the driven device is coupled by way of a resistor to the output of the driving device. A second device corresponding to the first device is provided, from the group consisting of an N-diode and a grounded gate NMOS. The second device is coupled between the input of the driven device and a ground bus. A receiving cell is selected from the cell library for laying out the input of the driven device. The protection cell has a cell height that is the same as a cell height of the receiving cell. An electronic design automation (EDA) tool is used to lay out the IC so as to include the protection cell and the receiving cell.

Although the subject matter has been described in terms of exemplary embodiments, it is not limited thereto. Rather, the appended claims should be construed broadly, to include other variants and embodiments, which may be made by those skilled in the art.

What is claimed is:

1. In an integrated circuit (IC) having a driving device with a first supply voltage Vdd1 and an output, and a driven device having an input and a second supply voltage Vdd2, a protection circuit comprising:
    a first power bus connected to Vdd2;
    a first ground bus connected to a ground supply voltage, arranged so that a distance between the first power bus and the first ground bus matches a distance between a power bus of the driven device and a ground bus of the driven device;
    a first device from the group consisting of a P-diode and a gate-Vdd PMOS, the first device coupled between the first power bus and the input of the driven device, the input of the driven device coupled by way of a resistor to the output of the driving device, the first device having first and second N+ regions connected by a third N+ region to form a U-shape with the third N+ region adjacent to an edge of the protection circuit having the first power bus; and
    a second device corresponding to the first device, from the group consisting of an N-diode and a grounded gate NMOS, the first and second devices arranged symmetrically about horizontal and vertical centerlines of the protection circuit, the second device coupled between the input of the driven device and the ground bus.

2. The protection circuit of claim 1, wherein:
    the first device is positioned near a PMOS of the driven device, the PMOS of the driven device connected to the input of the driven device, and
    the second device is positioned near an NMOS of the driven device, the NMOS of the driven device connected to the input of the driven device.

3. The protection circuit of claim 1, wherein:
    the first power bus, first ground bus, first device and second device of the protection circuit form a first unit cell having a first cell height, and
    the protection circuit further comprises a second unit cell having a second cell height equal to the first cell height, the second unit cell having a second power bus connected to the first power bus, the second unit cell having a second ground bus connected to the first ground bus, the second unit cell having a first device thereof coupled between the second power bus and the input of the driven device, the second unit cell having a second device thereof coupled between the input of the driven device and the ground bus, the second unit cell placed adjacent the first unit cell.

4. The protection circuit of claim 1, wherein:
    the first device is a P diode a P+ region between the first and second N+ regions, the N+ regions connected to Vdd2, the P+ region connected to the input of the driven device and
    the second device is an N diode having first and second connected P+ regions, and an N+ region near the first and second P+ regions, the P+ regions connected to ground, the N+ region connected to the input of the driven device.

5. The protection circuit of claim 4, further comprising at least one dummy pattern adjacent the first or second N+ region of the first device and/or the first or second P+ region of the second device, the dummy pattern arranged in a direction extending from the power bus to the ground bus.

6. The protection circuit of claim 1, wherein:
    the first device is a gate-Vdd PMOS, the N+ regions and an inner one of the P+ regions connected to Vdd2, and outer ones of the P+ regions connected to the input of the driven device, and a gate electrode coupled to Vdd2, the gate electrode having portions between and above ones of the plurality of P+ regions, and
    the second device is a gate grounded NMOS having first and second P+ regions connected by a third P+ region, and a plurality of N+ regions between the first and second P+ regions, the P+ regions and an inner one of the N+ regions connected to ground, and outer ones of the N+ regions connected to the input of the driven device, and a gate electrode coupled to ground, the gate electrode having portions between and above ones of the plurality of N+ regions.

7. The IC of claim 6, wherein the outer ones of the P+ regions of the first device and the outer ones of the N+ regions of the second device are connected to an H-shaped conductive pattern.

8. An integrated circuit (IC) comprising:
    a driving device with a first supply voltage Vdd1 and an output,
    a driven device having an input and a second supply voltage Vdd2,
    a protection circuit for the IC, the protection circuit including:
        a P-diode coupled between a first power bus coupled to Vdd2 and the input of the driven device, the P diode having first and second N+ regions connected by a third N+ region to form a U-shape with the third N+ region adjacent to an edge of the protection circuit having the first power bus, and a P+ region between the first and second N+ regions, the N+ regions connected to Vdd2, the P+ region connected to the input of the driven device, the input of the driven device coupled by way of a resistor to the output of the driving device; and
        an N-diode, the P diode and N diode arranged symmetrically about horizontal and vertical centerlines of the protection circuit, the N-diode coupled between the input of the driven device and a ground bus,
    wherein a distance between the first power bus and the first ground bus matches a distance between a power bus of the driven device and a ground bus of the driven device.

9. The IC of claim 8, further comprising:
    a second protection unit circuit abutted directly to the protection circuit, the second protection unit circuit having a second power bus configured to be connected to the first power bus, the second protection unit circuit having a second ground bus connected to the first ground bus, the second protection unit circuit having a first device thereof coupled between the second power bus and the input of the driven device, the second protection unit circuit having a second device thereof coupled between the input of the driven device and the ground bus.

10. The IC of claim 8, wherein:
the N diode has first and second P+ regions connected by a third P+ region, and an N+ region between the first and second P+ regions, the P+ regions connected to ground, the N+ region connected to the input of the driven device.

11. The IC of claim 10, further comprising
a second protection circuit configured to be abutted with the first protection circuit, the second protection circuit comprising:
a P diode having first and second connected N+ regions, and a P+ region between the first N+ region and one of the first and second N+ regions of the P diode of the first protection circuit, the N+ regions of the second protection cell to be connected to Vdd2, the P+ region to be connected to the input of the driven device, and
an N diode having first and second connected P+ regions, and an N+ region between the first P+ region and one of the first and second P+ regions of the N Diode of the first protection circuit, the P+ regions of the second protection circuit to be connected to ground, the N+ region connected to the input of the driven device.

12. An integrated circuit (IC), comprising:
a driving device with a first supply voltage Vdd1 and an output;
a driven device having an input and a second supply voltage Vdd2;
a protection circuit including:
  a gate-Vdd PMOS coupled between a first power bus connected to Vdd2 and the input of the driven device, the gate-Vdd PMOS having first and second N+ regions connected by a third N+ region to form a U-shape with the third N+ region adjacent to an edge of the protection circuit having the first power bus, and a plurality of P+ regions between the first and second N+ regions, the input of the driven device coupled by way of a resistor to the output of the driving device; and
  a grounded gate NMOS (GGNMOS) coupled between the input of the driven device and a ground bus, the GGNMOS and gate-Vdd PMOS arranged symmetrically about horizontal and vertical centerlines of the protection circuit; and
wherein the protection circuit occupies a first region having a cell height that is the same as a cell height of a second region having the input of the driven device.

13. The IC of claim 12, further comprising a second protection circuit configured to be abutted with the first protection circuit, the second protection circuit comprising:
a gate-Vdd PMOS (GDPMOS) having first and second connected N+ regions, and a plurality of P+ regions between the first N+ region and one of the first and second P+ regions of the GDPMOS of the first protection circuit, the N+ regions and an inner one of the P+ regions of the second protection circuit connected to Vdd2, and outer ones of the P+ regions connected to the input of the driven device, and a gate electrode coupled to Vdd2, the gate electrode having portions between and above ones of the plurality of P+ regions, and
a gate grounded NMOS (GGNMOS) having first and second connected P+ regions and a plurality of N+ regions between the first P+ region and one of the first and second P+ regions of the GGNMOS of the first protection cell, the P+ regions and an inner one of the N+ regions connected to ground, outer ones of the N+ regions connected to the input of the driven device, and a gate electrode coupled to ground, the gate electrode having portions between and above ones of the plurality of N+ regions.

14. The IC of claim 12, wherein the first power bus abuts a power bus of the driven device.

15. The IC of claim 14, wherein the ground bus of the protection device abuts a ground bus of the driven device.

16. The IC of claim 12, further comprising:
a second protection circuit abutting the first protection circuit, the second protection circuit having a cell height that is the same as the cell height of the first protection circuit, the second protection circuit comprising:
  a first device corresponding to the first device of the first protection circuit, and
  a second device corresponding to the second device of the second protection circuit.

17. The IC of claim 16, further comprising one or more additional second protection circuits abutting the second protection circuit.

18. The IC of claim 16, wherein the second protection circuit occupies a region having a smaller cell width than a cell width of a region containing the first protection circuit.

19. The IC of claim 18, wherein:
an active region of the first protection circuit has a U configuration; and
a corresponding active region of the second protective circuit has an L configuration.

20. The IC of claim 12, wherein:
the N+ regions and an inner one of the P+ regions are connected to Vdd2,
outer ones of the P+ regions are connected to the input of the driven device by to an H-shaped conductive pattern, and
a gate electrode coupled to Vdd2, the gate electrode having portions between and above ones of the plurality of P+ regions.

* * * * *